United States Patent
Yu et al.

(10) Patent No.: US 6,256,347 B1
(45) Date of Patent: Jul. 3, 2001

(54) PIXEL BLOCK COMPRESSION APPARATUS IN AN IMAGE PROCESSING SYSTEM

(75) Inventors: Haoping Yu; Barth Alan Canfield, both of Indianapolis; Billy Wesley Beyers, Jr., Greenfield, all of IN (US); Wai-man Lam, Mohegan Lake, NY (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 08/911,525

(22) Filed: Aug. 12, 1997

Related U.S. Application Data

(60) Provisional application No. 60/033,608, filed on Dec. 17, 1996.

(51) Int. Cl.[7] .................................................. H04N 7/12
(52) U.S. Cl. ........................................................ 375/240.13
(58) Field of Search ............................ 375/240; 348/384, 348/390, 391, 393, 394, 395, 396, 397, 409, 415, 416

(56) References Cited

U.S. PATENT DOCUMENTS

| | | | |
|---|---|---|---|
| 4,422,094 | 12/1983 | Lewis, Jr. et al. | 358/37 |
| 5,045,925 | 9/1991 | Saito | 358/13 |
| 5,070,402 | * 12/1991 | Ishii | 348/421 |
| 5,258,835 | 11/1993 | Kato | 358/135 |
| 5,307,163 | 4/1994 | Hatano et al. | 348/415 |

(List continued on next page.)

FOREIGN PATENT DOCUMENTS

| | | | |
|---|---|---|---|
| 0392617 | 10/1990 | (EP) | H04N/9/80 |
| 0687111A2 | 12/1995 | (EP) | H04N/7/24 |
| 0778709A1 | 6/1997 | (EP) | H04N/7/50 |
| 6-062431 | 3/1994 | (JP) | H04N/11/04 |
| WO97/47139 | 12/1997 | (WO) | H04N/7/26 |

OTHER PUBLICATIONS

"Video compression makes big gains", by Peng H. Ang, Peter A. Ruetz, and David Auld—LSI Logic Corp., IEEE Spectrum—Oct., 1991, pp. 16–19.

"Fundamentals of Digital Image Processing", by Anil K. Jain, pp. 476–498, Prentice–Hall International, Inc., 1989.

"Principles of Digital Audio", Third Edition, by Ken C. Pohlmann, pp. 356–357, McGraw–Hill, Inc., 1995.

(List continued on next page.)

*Primary Examiner*—Chris S. Kelley
*Assistant Examiner*—Allen Wong
(74) *Attorney, Agent, or Firm*—Joseph S. Tripoli; Ronald H. Kurdyla; Alexander J. Burke

(57) ABSTRACT

A memory efficient image processor receives DPCM prediction error values from decompressed MPEG coded digital video signals in the form of pixel blocks containing luminance and chrominance data in a 4:2:2 or 4:2:0 format and recompresses the pixel blocks to a predetermined resolution. Luminance and chrominance data are processed with different compression laws during recompression. Luminance data are recompressed to an average of six bits per pixel, and only a reference pixel and one other pixel are processed separately from all other luminance pixels in a block. Chrominance data are recompressed to an average of four bits per pixel. Each pixel block is stored with overhead information facilitating efficient and accurate reconstruction. Accurate pixel reconstruction is facilitated by processing a reference pixel accurately; scaling the pixel block; employing quantization tables which are symmetrical and fitted to the domain of the pixel block; biasing negative prediction error values to positive values; using short codewords in quantization tables at levels which are most likely to occur statistically; and processing each pixel with three, four or five bit quantization to ensure maximum resolution and an overall four-bit average for the pixel block.

7 Claims, 8 Drawing Sheets

U.S. PATENT DOCUMENTS

| | | | |
|---|---|---|---|
| 5,539,865 | | 7/1996 | Gentile ................................. 395/115 |
| 5,541,595 | | 7/1996 | Meyer .................................... 341/67 |
| 5,627,599 | | 5/1997 | Hong .................................... 348/643 |
| 5,838,597 | * | 11/1998 | Pau ................................. 364/715.02 |
| 5,844,608 | * | 12/1998 | Yu ....................................... 348/390 |

OTHER PUBLICATIONS

T. Kondo et al., Adaptive Dynamic Range Coding Scheme for Future HDTV Digital VTR, Signal Processing of HDTV, III, Turin, Italy, Sep. 4–6, 1991, No. Workshop 4, pp. 43–50.

P. Pirsch: "Block Coding of Color Video Signals", NTC 1977 Conference Record, Dec. 5–7, 1977, pp. 10:5–1—10:5–5.

*Patent Abstracts of Japan, vol. 018, No. 308, Jun. 13, 1994.

P. Monet & E. Dubois: "Block Adaptive Quantization of Images", IEEE Transactions on Communications, vol. 41, No.2, Feb. 1993, pp. 303–306.

* cited by examiner

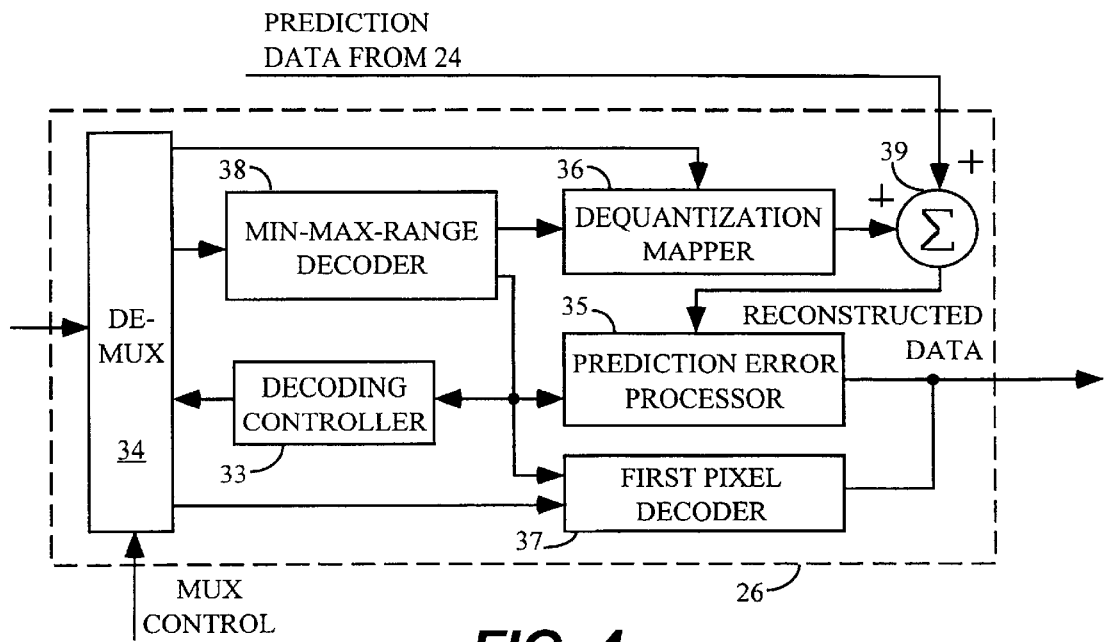
FIG. 4
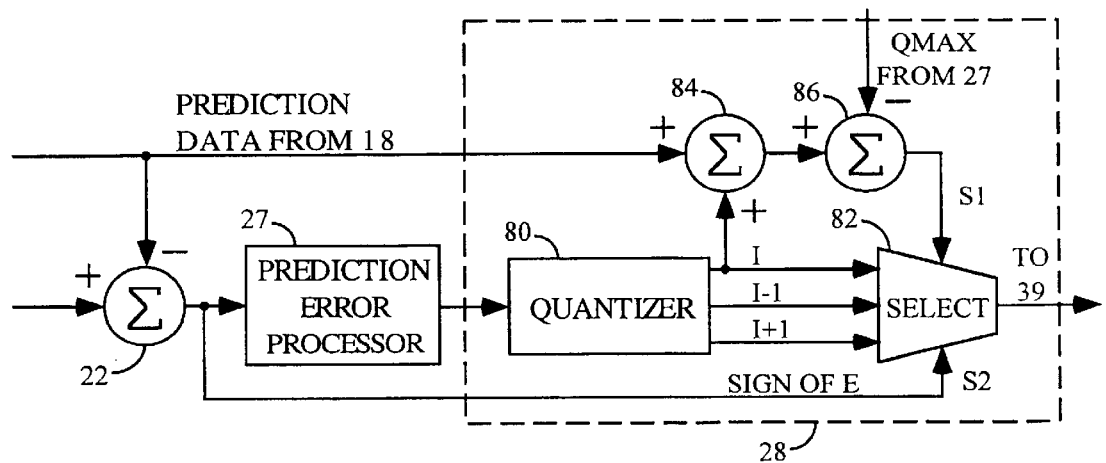
FIG. 5A
|  | + S1 | − S1 |
|---|---|---|
| + S2 | I−1 | I |
| − S2 | I | I+1 |
FIG. 5B

| INDEX | DECISION POINT | RECON. LEVEL | CODE WORD |
|---|---|---|---|
| 0 | 2 | 0 | 110 |
| 1 | 8 | 5 | 000 |
| 2 | 16 | 12 | 010 |
| 3 | 25 | 20 | 100 |
| 4 | 38 | 32 | 111 |
| 5 | 47 | 44 | 101 |
| 6 | 55 | 52 | 011 |
| 7 | 61 | 59 | 001 |

| PREDETERMINED RANGE | 16 | 32 | 64 | 96 | 128 | 196 | 256 |
|---|---|---|---|---|---|---|---|
| RANGE BITS | 3 | 3 | 3 | 3 | 3 | 3 | 3 |
| MINIMUM BITS | 8 | 3 | 3 | 3 | 3 | 3 | 0 |
| REFERENCE PIXEL BITS | 3 | 4 | 5 | 6 | 6 | 7 | 7 |
| OVERHEAD BITS | 10 | 6 | 7 | 8 | 8 | 9 | 6 |

| INDEX | DECISION POINT | RECON. LEVEL | CODE WORD |
|---|---|---|---|
| 0 | 1 | 0 | 1110 |
| 1 | 4 | 3 | 000 |
| 2 | 7 | 6 | 0100 |
| 3 | 10 | 9 | 0110 |
| 4 | 13 | 11 | 1000 |
| 5 | 19 | 16 | 1010 |
| 6 | 27 | 23 | 1100 |
| 7 | 36 | 32 | 1111 |
| 8 | 44 | 41 | 1101 |
| 9 | 50 | 48 | 1011 |
| 10 | 53 | 53 | 1001 |
| 11 | 56 | 55 | 0111 |
| 12 | 59 | 58 | 0101 |
| 13 | 62 | 61 | 001 |

*FIG. 6B*

| INDEX | DECISION POINT | RECON. LEVEL | CODE WORD |
|---|---|---|---|
| 0 | 1 | 0 | 11110 |
| 1 | 3 | 2 | 000 |
| 2 | 5 | 4 | 01000 |
| 3 | 7 | 6 | 01010 |
| 4 | 9 | 8 | 01100 |
| 5 | 11 | 10 | 01110 |
| 6 | 13 | 12 | 10000 |
| 7 | 15 | 14 | 10010 |
| 8 | 17 | 16 | 10100 |
| 9 | 19 | 18 | 10110 |
| 10 | 21 | 20 | 11000 |
| 11 | 23 | 22 | 11010 |
| 12 | 29 | 26 | 11100 |
| 13 | 34 | 32 | 11111 |
| 14 | 40 | 38 | 11101 |
| 15 | 42 | 42 | 11011 |
| 16 | 44 | 44 | 11001 |
| 17 | 46 | 46 | 10111 |
| 18 | 48 | 48 | 10101 |
| 19 | 50 | 50 | 10011 |
| 20 | 52 | 52 | 10001 |
| 21 | 54 | 54 | 01111 |
| 22 | 56 | 56 | 01101 |
| 23 | 58 | 58 | 01011 |
| 24 | 60 | 60 | 01001 |
| 25 | 62 | 62 | 001 |

*FIG. 6C*

PIXEL BLOCK COMPRESSION APPARATUS IN AN IMAGE PROCESSING SYSTEM

This application claims priority of a U.S. provisional application, Ser. No. 60/033,608, filed Dec. 17, 1996 by Yu et al.

FIELD OF THE INVENTION

This invention concerns apparatus for decreasing the memory requirements of a digital video processor. In particular, the invention describes apparatus for accurately compressing pixel information before storage in memory.

BACKGROUND OF THE INVENTION

The efficient use of memory is important in the design and operation of image processors. For example, consumer products such as television systems may use image processors including MPEG-2 signal processing. The MPEG (Motion Picture Experts Group) signal compression standard (ISO/IEC 13181-2, May 10, 1994) is a widely accepted image processing standard which is particularly attractive for use with satellite, cable and terrestrial broadcast systems employing high definition television (HDTV) processing among other forms of image processing. Products using high definition displays require 96 Mbits or more of memory to temporarily store MPEG decoded frames prior to display. An MPEG processor requires these frames for motion estimation and compensation to reconstruct accurate images for display.

Systems which reconstruct images from MPEG decoded picture elements (pixels or pels) employ Differential Pulse Coded Modulation (DPCM). In DPCM processing a processor generates a prediction value which anticipates the next pixel value. A summation network subtracts the prediction from the actual pixel value resulting in a difference which is used to represent the video data. This difference, known as prediction error, is generally smaller than the data value, so processing the difference rather than the original pixel value reduces system bandwidth requirements. The prediction error may have a positive or negative value. Ang et al., "Video Compression Makes Big Gains," IEEE Spectrum, October 1991, describes an MPEG encoder and decoder.

Memory efficient image processors use less memory to store image frames by recoding (recompressing) the block data prior to storage. In the spacial domain, reducing the number of bits per pixel used to store the image frames adversely affects the picture quality if the pixels can not be accurately reconstructed to their original value. Artifacts may occur, especially in smooth areas of the image. Memory reduction image processors should accurately quantize and dequantize the MPEG decoded signal as efficiently and economically as possible.

It is known to take advantage of human optical reception limitations and process luminance and chrominance data differently. Optimizing compression laws for each type of data to account for the energy and frequency components in the data, as well as what the human eye can see, is described in U.S. Pat. No. 4,575,749, by Acampora, et al. Acampora addresses amplitude compression to reduce noise in television signals prior to transmission. Display formats such as 4:2:2 and 4:2:0 also describe compression of video data where luminance and chrominance data have been processed differently. Format ratios 4:2:2 and 4:2:0 indicate that a chrominance data block contains one-half or one-quarter of the amount of information that a luminance data block contains. However, once the video data are received in a display processor, the data are represented as n-bit pixel data. The above known compression techniques do not address compression relative to the display processor.

In the display processor, luminance and chrominance data may be processed separately, but not with respect to recompression. An example of the display processor processing luminance and chrominance data differently would be converting 4:2:2 or 4:2:0 ratio data to raster line data, in that not every pixel is defined with chrominance information. However, this has nothing to do with compressing or recompressing data. Until the MPEG format became available, there was little concern for memory allocation for a display processor, because there was no need for calculating a picture frame from motion vectors or motion composition information. With the advent of the MPEG format, multiple frames of pixel data have to be stored in display associated memory to reconstruct picture frames. Co-pending application Ser. No. 08/579,129 describes recompression of video pixel data prior to storage in frame memory, before being received by the display processor.

More specifically, because chrominance data is commonly defined by fewer pixels (bit-limited) as compared to luminance data (e.g., in the 4:2:2 or 4:2:0 format), further compression or recompression of chrominance data is contraindicated. Compression or recompression of chrominance data, such as by means as quantization, now seriously compromises the ability to accurately reconstruct the original chrominance data for display resulting in reduced picture quality. Reducing memory requirements for display processors such as may be attained through recompressing luminance and chrominance pixel data prior to storage in frame memory, and the need for accurately reconstructing image data for display are competing interests relative to one another. This is particularly true in the case of a high definition system, such as HDTV, where details are clearly displayed.

The present inventors recognize the desirability of providing an efficient data reduction system employing minimal hardware and software which will save memory and reduce the physical size of the processor while minimizing artifacts introduced into the reconstructed image. The disclosed system solves these problems by processing luminance and chrominance data differently according to the principles of the present invention.

SUMMARY OF THE INVENTION

A memory efficient image processor according to the present invention receives a digital data stream of MPEG formatted video data. The MPEG data is decoded and decompressed and presented to the processor as image pixel blocks of luminance and chrominance data. Luminance and chrominance data are recompressed to a predetermined number of bits per pixel block, wherein each pixel representation is allocated an average number of bits for storage in frame memory. The average number of bits per pixel representation is at least one bit less for chrominance data than for luminance data.

A BRIEF DESCRIPTION OF THE DRAWINGS

FIG. 4 shows details of the decompression portion of the FIG. 1 system.

FIG. 5A shows details of the quantization mapper portion of FIG. 2.

FIG. 5B is a truth table for the Select block of FIG. 5A.

FIGS. 6A, 6B and 6C are three-bit, four-bit and five-bit quantization/dequantization tables, respectively.

FIG. 7 shows apparatus for producing symmetrical dequantization tables.

FIG. 8 is a table showing overhead quantization bits.

DETAILED DESCRIPTION OF THE PREFERRED EMBODIMENT

Figure 1:
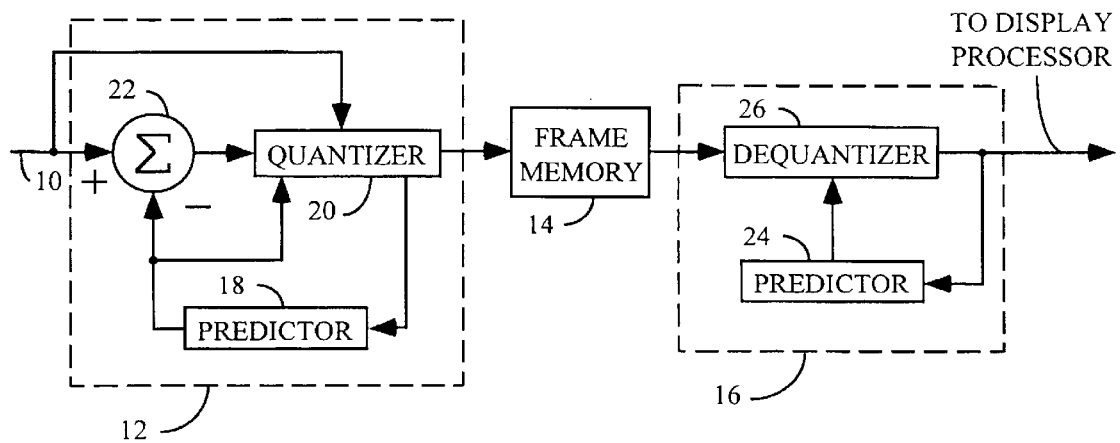
FIG. 1 is a block diagram of a pixel block processor including a system according to the principles of the present invention.

As an introduction, an exemplary embodiment of the invention will be briefly described before detailing the elements of the invention. The exemplary embodiment enables picture element (pixel) data to be compressed from eight-bit values to four-bit values for chrominance data. This is a lossy 16 to 1 decrease in resolution which, ordinarily, would result in severe degradation in video picture quality. The techniques embodying the invention allow accurate data reconstruction.

A memory efficient image processor determines DPCM prediction error values to be quantized for luminance and chrominance data components of pixel blocks. Luminance data is compressed by a six-bit, 64-level quantization table, whereas chrominance data is compressed with a set of three, four and five-bit quantization tables customized to and accessed by a selected range from a set of predetermined ranges. A reference pixel from each pixel block is compressed differently from other pixels to achieve initial accuracy in the prediction network.

Block parameters are determined, encoded and stored with the compressed pixel block to facilitate reconstruction. The quantization tables output short codeword symbols at levels which are statistically likely to be accessed, thereby compensating for block parameter storage in the fixed memory space. Pixels are individually processed to ensure maximum resolution and an overall four-bit per pixel average including block parameters.

Prior to quantization, negative prediction error values are biased to provide a positive value within the scope of the quantizer. Thus, the quantizer receives positive values and tables include only positive decision points. Symmetrical tables allow the table midpoints and one-half of the tables to reside in ROM, whereas the other half is mapped by circuitry. In practice, a television receiver may include an MPEG decoder. A data reduction network quantizes a decoded and decompressed MPEG signal representing image blocks before storage in frame memory, reconstructing the blocks as needed for an image display. A display device displays image data derived from frame memory. Data received and processed by the network is a 1920×1080 pixel, 4:2:2 or 4:2:0 high definition video signal. Luminance data is partitioned into 8×8 pixel blocks in the spacial domain with chrominance data partitioned according to the particular format.

The network processes pixel block data as described above. For each pixel block of luminance data, the first pixel is shifted to seven bits, throwing the least significant bit away. The last pixel is quantized with the five-bit quantization table supplied for the range of 256. All other bits are quantized with a six-bit quantization table. The overall result is six-bit per pixel recompression.

For chrominance data, the network scans a pixel block and determines the range, the minimum and maximum pixel values for the block. Representative predetermined values are substituted for the range and the minimum pixel values, and stored with the reference pixel value as a header to the data. The reference pixel may be the first pixel of the block, for example. A controller uses registers for each chrominance pixel block and selects a three, four or five-bit quantization table to process each pixel and maintain a four-bit per pixel average after compression. Three-bit symbols in selected levels of the four and five-bit tables compensate for the bits needed to store the header. Three-bit symbols reside at levels where input data is statistically most likely to occur, thereby minimally affecting compression resolution. If excess bits are saved by outputting three-bit symbols, high resolution five-bit symbols are output. Likewise, if not enough bits are saved, a three-bit table is accessed to maintain an average of four bits for each pixel including the header. Luminance (luma) data is reduced by 25% and chrominance (chroma) data is reduced by 50% relative to the pixel block available after received data is decompressed from the received transport stream. With the disclosed system, bit-limited chroma data may be recompressed with fewer bits than recompressed luminance data without adversely affecting picture quality. The above system facilitates accuracy during pixel reconstruction.

The following description is an example within the context of an MPEG-2 compatible high definition television receiver to aid the explanation of the invention. The system described allows fixed-length compression on a data block-by-data block basis for a given or selected compression ratio. Storing a fixed length data block allows random block access. The fixed-length data block is achieved using a combination of features described in this document. The system according to the principles of the present invention may be employed to effectively compress and decompress block data from any source and should not be limited to television receivers.

In FIG. 1, a decoder, for example an MPEG decoder (not shown), provides a block of MPEG decoded pixel data to input 10 of a memory reduction processor including compressor 12. Compressor 12 includes a predictor 18, a quantizer 20, and a combiner 22. Predictor 18 employs well known principles and may be of the type described by Jain, "Fundamentals of Digital Image Processing," Prentice-Hall, p. 484 (1989), for example.

Quantizer 20 provides a data reduced pixel block to memory 14. When a display processor (not shown) accesses the reduced data block in memory 14 to display an image, decompressor 16 reconstructs the original data block. Decompressor 16 includes predictor 24 and dequantizer 26 to retrieve reduced data from memory 14 and to reconstruct the reduced data block. Quantizer 20 and dequantizer 26 are arranged according to the principles of the present invention as will be discussed. Predictor 24 is similar to predictor 18.

Input 10 of compressor 12 receives a pixel block from an MPEG decoder, which will be discussed in association with FIG. 10. The pixel block is in the spatial domain, and comprises an 8×8 block of image pixels representing luminance (luma) data, for example. In a system processing 4:2:2 data, chrominance (chroma) data comprises an 8×4 block of image pixels, and in a system processing 4:2:0 data, chrominance (chroma) data comprises an 4×4 block of image pixels, for example. Input 10 supplies the pixel block data to a non-inverting input of combiner 22 and to quantizer 20. Predictor 18 supplies pixel prediction data to an inverting input of combiner 22 and to quantizer 20. Combiner 22 combines its signals from inverting and non-inverting inputs and provides the difference to quantizer 20. Quantizer 20 outputs quantized image values to predictor 18 and quantized prediction error values to memory 14 for storage.

Luminance data is processed differently than chrominance data. Each pixel of the luminance pixel block is allocated six bits of storage space in memory 14 on average. Quantizer 20 selects a reference pixel from a received pixel block. The reference pixel may be the first pixel of the block, for example. The reference pixel is bit-shifted right one bit and stored in a predetermined location with the remaining quantized pixels of the block in memory 14. One other pixel from the block is processed differently from the reference pixel and all other remaining pixels from the pixel block. This other pixel may be the last pixel of the pixel block, for example. It is processed using a 26-level, five-bit quantization table, as is shown in FIG. 6C. Compressing this pixel with five bits compensates for the reference pixel processing because saving one bit in the last pixel position maintains the six-bit average which was compromised by using seven bits for the first pixel. If the accessed level in the five-bit table contains a short codeword, the codeword is zero padded to five bits. All other pixels of the luminance pixel block are compressed using a 64-level, six-bit quantization table. The quantization table is designed to accept only positive DPCM prediction error values. Details of the design of this table are the same as for all quantization tables in this system, and will be discussed later. Also discussed later is the biasing of negative prediction error values to ensure positive input values into the quantization tables, which is the same for both luma and chroma data.

Figure 2:
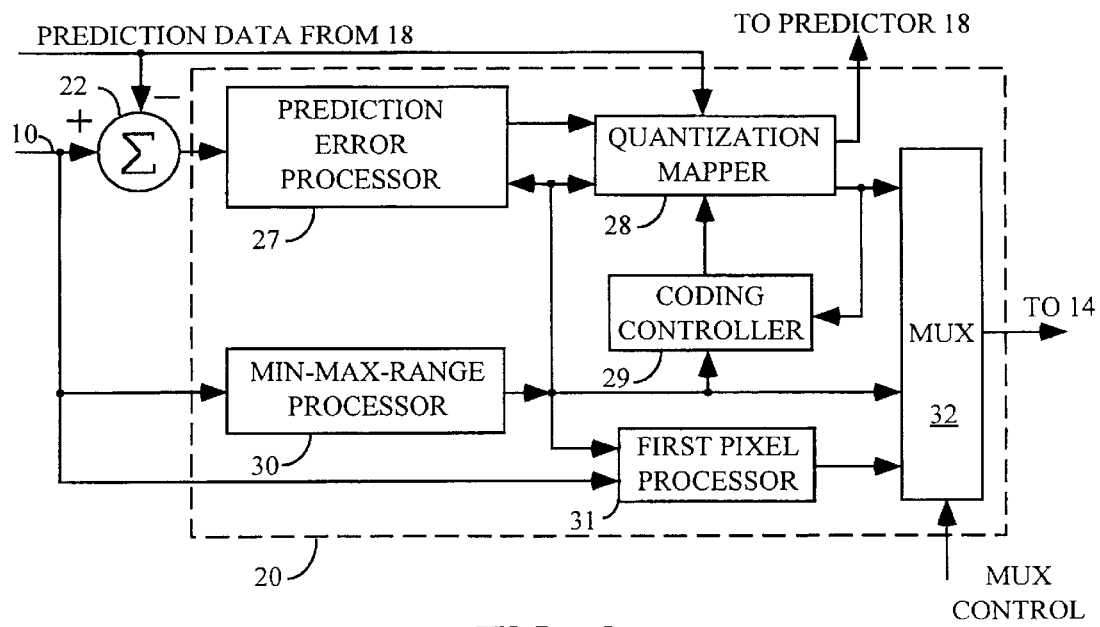
FIG. 2 shows details of the compression portion of the FIG. 1 system.

Chroma data is processed and compressed in a different manner than luma data. FIG. 2 illustrates quantizer 20 in greater detail as it pertains to chroma data. The same reference numbers identify common elements in FIGS. 1 and 2. Specifically, quantizer 20 includes prediction error processor 27, quantization mapper 28, coding controller 29, min-max-range processor (MMRP) 30, first pixel processor 31, and multiplexer 32. Input 10 provides block pixel data to MMRP 30, which scans the pixel block and determines the minimum pixel value, the maximum pixel value, and the range for the block. MMRP 30 selects a predetermined range from a set of predetermined ranges as a function of the actual range, and exchanges the selected predetermined range for the actual range for subsequent use within the network. MMRP 30 compresses the minimum, maximum and predetermined range block parameter values and transfers them to multiplexer 32.

The minimum pixel value and the range are also transferred to first pixel processor 31, and the predetermined range is transferred to prediction error processor 27, as will be discussed. Prediction error processor 27 receives prediction error data from combiner 22 and biases negative values with the selected predetermined range. Quantization mapper 28 receives biased and unbiased prediction error values from prediction error processor 27. These values are quantized and sent to multiplexer 32. Quantization mapper 28 also sends quantized prediction error values to predictor 18 which predictor 18 uses to calculate prediction data. Multiplexer 32 sends the block parameters and the quantized data to memory 14 under timing and control which will be discussed later. The block parameters represent overhead data which are stored in memory 14 within a parameter field associated with the quantized pixel block. The parameter field and the quantized data together form a packet which consolidates all of the information needed by decompressor 16 to access appropriate dequantization tables and to reconstruct the pixel block. Coding controller 29 oversees the transfer of block parameters and compressed data, as well as the selection of quantization tables for individual pixel blocks, as will be discussed.

First pixel processor 31 receives the pixel block from input 10, and identifies a predetermined reference pixel value. The block minimum pixel value received from MMRP 30 facilitates compression of the reference pixel independently of other block pixels. The compressed reference pixel is represented with sufficient bits for dequantizer 26 to reconstruct its original value in a lossless or near lossless manner. First pixel processor 31 passes the compressed reference pixel value as a block parameter to multiplexer 32 which transfers block parameters, including the reference pixel value, and the quantized data to memory 14. Dequantizer 26 uses the reference pixel as a prediction value for the quantized block pixels during pixel decompression. Since the first value (the reference pixel value) used in the prediction network during decompression is independent, a given pixel block can be decompressed without information from other pixel blocks. This value is also accurate, which eliminates a propagating prediction error from the reconstructed data.

The reference pixel is compressed using the pixel block minimum value as a predictor for deriving the compressed value. The minimum value is subtracted from the reference value and the difference is divided by two. The result is stored in memory 14 with one less bit than is necessary for a binary representation of the predetermined range. The predetermined range defines the number of bits used to store the compressed reference pixel value because, when using block pixel values as predictors for other values in the same pixel block, the difference between any two block pixel values, such as the reference and minimum pixel values, will fall within the domain of the range. The compressed reference value uses one bit less than is necessary to represent the range because the difference is divided by two, which reduces the number of bits required for a binary representation by one bit.

Quantizer 20 and dequantizer 26 access quantization and dequantization tables respectively which are optimized to each block. The quantization and dequantization tables include values based on an approximate range of the pixel block. Min-max-range quantizer 30 receives an input data block and scans it to determine the minimum pixel value and the maximum pixel value. Quantizer 30 then subtracts the minimum pixel value from the maximum pixel value and adds one (max−min+1) to calculate the range for the pixel block.

Quantizer 20 compares the calculated range to a set of predetermined ranges, at least one of which is greater than or equal to the calculated range, selects a predetermined range, and accesses quantization tables derived from the selected predetermined range. The predetermined range is selected by a best fit analysis that identifies the predetermined range which is the smallest value of the set that is larger than or equal to the actual calculated range. The quantization and dequantization tables are customized to include values within the domain of the selected predetermined range, and therefore include values of the entire actual range. Quantizer 20 employs DPCM processing and produces difference values which are prediction errors.

These prediction errors lie in the domain of the actual range if pixel values supplied to predictor 18 come from the same pixel block as the pixel for which predictor 18 is currently generating a prediction value. Compressor 12 follows and maintains this parameter. The actual range of a given pixel block is often significantly less than 256 (the maximum value of an 8-bit pixel value), and table levels derived from the predetermined range produce better resolution than table levels derived from 256, because the selected predetermined range is generally close in value to the actual range. Therefore, system accuracy and efficiency increase by customizing the table levels to the range.

Figure 3:
FIG. 3 depicts a packetized data format suitable for use by a system including the present invention.

To reconstruct the input block data, dequantizer 26 must know which predetermined range quantizer 20 used to access the quantization table employed when quantizing the pixel block. Representations of the range and other pixel block parameters are stored in memory 14 within a parameter field with the quantized pixel block. By storing a block parameter representation in memory 14 along with the quantized pixel block, decompressor 16 may access the proper dequantization table and reconstruct the pixel block efficiently and accurately. Other pixel block parameters included in the parameter field may be, for example, the minimum pixel block value or a reference pixel block value. FIG. 3 illustrates one possible configuration of a parameter field and compressed data. The parameter field consists of those block parameters contained within the dashed box in FIG. 3. In this embodiment, a parameter field is arranged as a header of a data packet containing a compressed data payload.

To maximize the reduction of frame memory without significantly degrading the displayed image, the overhead information represented by the block parameters in the parameter field is stored in memory 14. Every bit used to store the parameter field decreases the memory available for storing quantized pixels. Therefore, a system using the present invention decreases the number of bits required to store two of the block parameters, namely the range and minimum value, from eight bits to three bits for each parameter for most cases. This process works as follows.

The actual range is compared to a set of predetermined ranges to determine a best fit. The predetermined range becomes the value used to represent the range for the pixel block then being processed. The predetermined range is larger than the actual range to ensure that all pixel values within the pixel block are represented. The set of predetermined ranges includes seven values, which are 16, 32, 64, 96, 128, 192, and 256. Since the set is available to both quantizer 20 and dequantizer 26, the predetermined range may be represented in the parameter field by one index value. The index requires only three bits for a binary representation because there are only seven predetermined ranges to represent.

The system handles the minimum pixel value in a similar manner. For five of the seven predetermined ranges, the system accesses a predetermined set of eight minimum pixel values unique to the selected predetermined range. Quantizer 20 compares the actual minimum pixel value to the predetermined set and selects the largest predetermined minimum value which is less than or equal to the actual minimum value. The predetermined minimum then becomes the value used to represent the minimum pixel for the pixel block being processed. The set is available to both quantizer 20 and dequantizer 26, so the predetermined minimum may be represented in the parameter field by one index value. This index also requires three bits for a binary representation because there are only eight predetermined minimum pixel values to represent.

The set of eight predetermined minimum pixel values for five of the seven ranges are defined by equation (1a) below. The five ranges to which equation (1) applies are 32, 64, 96, 128, and 192. The equation provides a constant linear step for each range minimum beginning with zero.

Equation (1) below selects the predetermined minimum pixel value from the set Qmin(Rs,i) (equation (1a)) which is substituted for the actual minimum pixel block value.

$MAX_i\{f(x)\}$ indicates that the maximum value of i which satisfies the condition within the brackets is to be used to generate Qmin.

$$Qmin = MAX_i\{Qmin(Rs, i) | Qmin(Rs, i) <= Xmin; 0 <= i <= 7\}, \quad (1)$$

where:

$$Qmin(Rs,i) = INT\{i((256-Rs)/7)\}; 0 <= i <= 7. \quad (1a)$$

In these equations, i is the index value represented by three bits in the overhead parameter field.

$INT\{f(x)\}$ indicates that only the integer portion of the resulting value is used. The expression $f(x)$ within the brackets is representative of any expression, such as the one in equation (1), upon which the function INT operates. For the predetermined range of 256, no minimum value is stored because the minimum value for 256 is zero (0) for an eight bit word. For the predetermined range of 16, the original eight bit minimum value is used, because the resolution for this range is small relative to the minimum values available from equation (1). Using equation (1) to generate a minimum value for the range of 16, may cause actual pixel values to fall outside of the reconstructed data upon reconstruction. The minimum value is an offset representing the distance between zero and the minimum block pixel value.

Equation (1) may select a predetermined range which is not sufficient to cover the actual pixel block values when the quantized pixel block is reconstructed, because predetermined minimum values are less than the actual minimum value. For example, if in a given pixel block the minimum pixel value is 100 and the maximum pixel value is 140, then the selected predetermined range is 64. The selected predetermined minimum pixel value resulting from equation (1) is 82. The result of adding the selected minimum to the selected range is 146 which is greater than the actual maximum pixel value. Therefore, all of the values of the pixel block will be represented by the selected predetermined values. However, if the maximum pixel block value is instead 160, the selected predetermined values will remain the same but not completely represent the domain of the pixel block (160>146). In this case, the next higher predetermined range of 96 is selected and a new selected predetermined minimum value is 91. The sum of 91 and the predetermined range of 96 is 187, which is greater than the actual maximum pixel block value of 160. Therefore, the quantization and dequantization tables selected from this range will provide levels for all of the pixels in the block. Quantizer 28 performs the analysis described above to determine if the first selection of predetermined range and minimum pixel values is valid, or if the next larger predetermined range is necessary.

As stated earlier, if the prediction network derives its prediction values from pixel values within the same block, then the difference (E) between an actual pixel value and the predicted pixel value will be within the following limits:

$$-Range < E < Range, \text{ where} \quad (2)$$

$$Range = Xmax - Xmin + 1 \quad (3)$$

In equation (2), E is the prediction error. In equation (3), Xmax and Xmin are the actual maximum and minimum block pixel values respectively. Therefore, the range of pixel data from the block defines the values which quantization and dequantization tables will receive, and the limits for which the tables must provide for that particular block. If the range is smaller than the maximum value of the word size (256 for an 8 bit word), then the resolution of the quantization and dequantization tables may be increased.

Figures 6A, 7, 8:
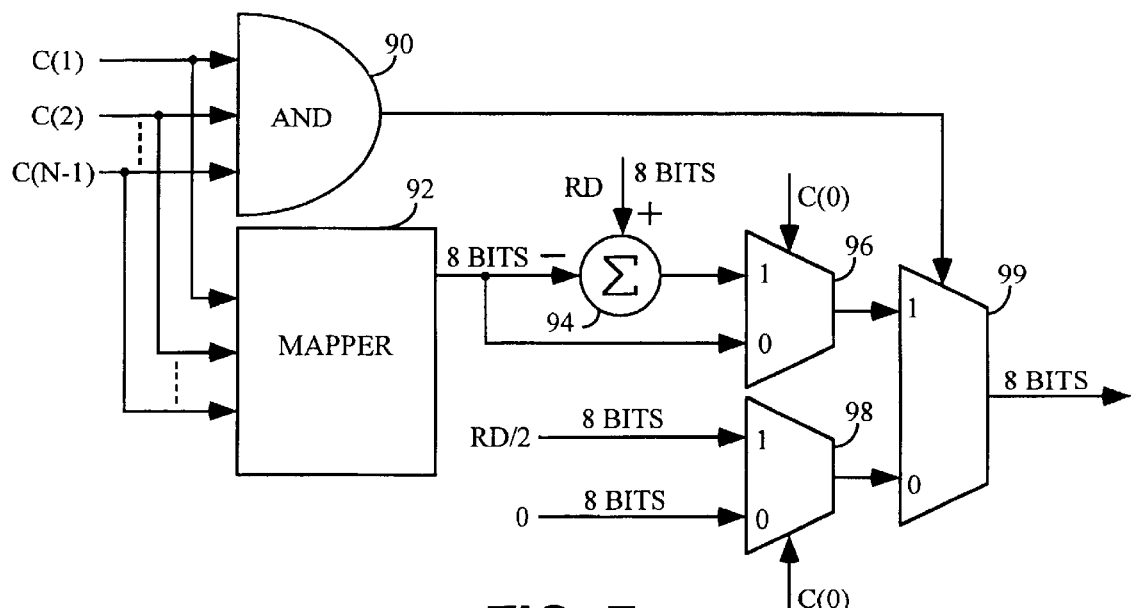

Both luma and chroma data are processed with biased negative prediction errors. Therefore, quantization and dequantization tables for luma and chroma data are designed to accept only positive input values. Quantization and dequantization tables employing biased negative prediction error values have twice the resolution as tables designed only to the range of the pixel block. The resolution is doubled because the tables need only cover values from zero to the positive range value rather than all values between the negative and positive range. FIGS. 6A, 6B and 6C show three-bit, four-bit and five-bit tables, respectively, for the predetermined range of 64. Prior to quantization, prediction error processor 27 (FIG. 2) detects if the prediction error from combiner 22 is positive or negative. If the value is positive it passes unchanged to quantization mapper 28. If the value is negative, prediction error processor 27 adds the predetermined range to the negative prediction error value before the value is passed to quantization mapper 28. Since a negative prediction error value is within the domain of the negative range value, adding the positive range value to the negative prediction error value results in a biased error value. This biased error value is positive (greater than zero) and is less than the positive range value. Quantization mapper 28 receives both biased and unbiased prediction error values and quantizes them with a quantization table adapted to the domain of the positive predetermined range. Quantized error values are passed to multiplexer 32 and then stored in memory 14 under the control of a system controller (not shown). Since the table only quantizes values from zero to the range−1 instead of from the negative range value to the positive range value, the resolution of the table is doubled.

FIG. 4 is a block diagram of dequantizer 26 of FIG. 1. Under control of a system microprocessor, demultiplexer 34 receives a data packet containing a parameter field and quantized data. Demultiplexer 34 sends the minimum pixel value index and the predetermined range index to min-max-range decoder (MMRD) 38. Demultiplexer 34 sends the compressed first pixel value to first pixel decoder 37, which also receives the predetermined reconstructed range and minimum pixel values from MMRD 38. First pixel decoder 37 uses these three values to reconstruct the reference pixel and send it to predictor 24. Upon dequantization, demultiplexer 34 sends the quantized values to dequantizer mapper 36, which dequantizes the prediction error values and passes them to adder 39. Adder 39 adds the predicted value to the dequantized error value and passes the result to prediction error processor 35, which compares the result to the reconstructed maximum pixel block value. If the error value was biased to translate a negative value to a positive value before quantization, the result will be greater than the reconstructed maximum pixel value. If not, the result will be less than or equal to the reconstructed maximum pixel value. If prediction error processor 35 determines that the error value was biased, the predetermined range value is subtracted from the result, thereby correcting for the bias introduced on the quantization side of the network. Prediction error processor 35 and first pixel decoder 37 pass the reconstructed data including the reference pixel in proper order to an output network (not shown).

The values available to dequantizer 26 are quantized and/or encoded values. The reconstructed quantized minimum pixel value (Qmin) must be less than or equal to the actual minimum pixel value, and the reconstructed quantized maximum pixel value (Qmax) and the reconstructed quantized range value must be greater than or equal to their actual values. MMRP 30 ensures these requirements are met, as previously discussed. Since any pixel value must be greater than or equal to Qmin, adding the predetermined range to any reconstructed pixel value which includes biasing generally results in a value greater than Qmax by at least one.

However, quantization noise Nq may cause an incorrect determination of whether quantizer 20 detected a negative prediction error value and biased the value. Quantization noise is the difference between the actual pixel value and the reconstructed value caused by the resolution in the lossy quantization tables. Prediction error processor 35 adds the reconstructed level to the predetermined range and compares the result to Qmax. If the result is greater than Qmax, the predetermined range is subtracted from the result to attain the correct reconstructed pixel value. But, if Nq is positive, it may cause the result to be greater than Qmax, and prediction error processor 35 would falsely identify a biased prediction error. Likewise, if Nq is negative, it may cause the result to be less than Qmax, and prediction error processor 35 would falsely identify an unbiased prediction error.

FIG. 5A illustrates how quantizer mapper 28 (FIG. 2) ensures its output will not be misinterpreted due to quantization noise. Quantizer 80 provides three outputs for each pixel value quantized. The three values are the best reconstruction level for the decision point of the quantization table (I), and the reconstruction level on either side of the best level (I+1, I−1). Combiner 84 calculates the reconstructed pixel value for the best reconstruction value and the result is compared to Qmax by combiner 86. If the prediction error was biased (S2 is negative) and the result from combiner 86 is less than Qmax (S1 is negative), it is possible that upon reconstruction prediction error processor 35 will incorrectly determine that the dequantized prediction error value was not biased. To prevent this problem, the codeword corresponding to the next larger reconstruction level for the prediction error is sent to multiplexer 32. If the prediction error was not biased (S2 is positive) and the result from combiner 86 is greater than Qmax (S1 is positive), it is possible that upon reconstruction prediction error processor 35 will incorrectly determine that the dequantized prediction error value was biased. To prevent this problem, the codeword corresponding to the next smaller reconstruction level for the prediction error is sent to multiplexer 32. In all other cases, the best level is selected and sent to multiplexer 32.

When the first or last level in a quantization table is best, only the next greater or smaller quantization level is provided with the best level. FIG. 5B gives a truth table illustrating the choices from quantizer 80 available for output by quantization mapper 28, and when select unit 82 uses each of the choices. Since the quantization noise may cause the analysis of bias error correction to be incorrect, choosing a value of quantization noise with an opposite sign will not influence the relationship between Qmax and the reconstructed pixel value.

Because the absolute value of Nq is generally not large, quantizer 28 will normally choose the best quantization level. When quantizer 28 chooses the next larger or smaller level, the choice will induce added error into the reconstructed pixel. However, the error is minimized by selecting the closest level which will correct the problem in a table with resolution which is much better than known DPCM quantization tables. Generally, this correction does not cause noticeable degradation in the quality of the displayed picture.

Quantization resolution is often increased more than just the factor of two which occurs from biasing negative prediction errors to produce positive values. The selection of a predetermined range also leads to increased quantization resolution. For example, if for a given pixel block the selected predetermined range is 16, then the four bit table will exactly quantize the prediction error values in a lossless manner. The resolution increases by a factor of 16 from a range of 256 (for 8 bits) to 16 (256/16). By requiring only positive values in the quantization/dequantization table for the same positive range value, the resolution increases by another factor of 2 to a total factor of 32. This process may be used to calculate the increase in resolution for quantization/dequantization tables derived from any of the predetermined range values.

When MMRP 30 (FIG. 2) scans a chroma pixel block and selects a predetermined range from the set of seven, the data may be scaled to reduce the actual quantization tables required to compress the data. For the predetermined ranges of 32, 192, and 256 a set of three customized tables exist. These are the three, four and five-bit tables as discussed earlier. Data fitting three of the other predetermined ranges, the data is scaled up by a factor of two. Pixel blocks fitting the predetermined range of 32 are scaled to utilize the quantization tables accessed by the range of 64. For pixel blocks fitting the predetermined range of 96, the quantization tables for 192 are utilized. Likewise, for pixel blocks fitting the predetermined range of 128, the quantization tables for 256 are utilized. Scaling the data reduces the complexity of hardware and software, and reduces the amount of read only memory (ROM) required within the network. Upon reconstruction, scaled pixel blocks are divided by two after dequantization to maintain data accuracy.

All quantization tables for both luma and chroma data are constructed to be symmetrical about their midpoint. FIGS. 6A, 6B and 6C show the three, four and five-bit quantization tables for the predetermined range of 64. The symmetry allows only half of each table to be stored in ROM, whereas a simple hardware circuit implements the other half of each table. This reduces the size of ROM thereby reducing production costs.

Quantization tables are designed to a simple set of relationships, given below, creating symmetry about the midpoint of the table. In these relationships, I is the quantization level index; $D_I$ is the Ith decision point; $Q_I$ is the Ith reconstruction level; M is the total number of levels in a table; and Rd is the quantization range. A decision point is the value at which a pixel value input into a quantization table moves from one level to another within the table. The relationships are as follows:

$$M \text{ is an even number;} \tag{4}$$

$$D_I + D_{M-1-I} = Rd - 1 \text{ for } 0 <= I <= (M/2)-1; \tag{5}$$

$$Q_0 = 0; \tag{6}$$

$$Q_{M/2} = Rd/2; \tag{7}$$

$$Q_I + Q_{M-I} = Rd \text{ for } 1 <= I <= M/2. \tag{8}$$

The tables in FIGS. 6A, 6B and 6C conform to these relationships as do all quantization tables used in the network. If the tables accepted prediction error values which were not biased, in other words both positive and negative values, then M would be an odd number.

The output codeword symbols of the tables also have relationships to ensure symmetry advantageously allowing only half of the tables to be stored in ROM. All symbols in these relationships are the same as in the relationships above. The only additions are CI which is the codeword for the Ith level, and n, which is the number of bits in the codeword. These relationships are as follows:

$$C_1 = 0 \text{ and } C_{M-1} = 1 \text{ for short codewords;} \tag{9}$$

$$C_0 = (2^n) - 2; \tag{10}$$

$$C_{M/2} = (2^n) - 1; \tag{11}$$

$$C_I = 2I \text{ for } 2 <= I <= (M/2) - 1; \tag{12}$$

$$C_{(M/2)+I} = C_{(M/2)-I} + 1 \text{ for } 1 <= I <= (M/2) - 1. \tag{13}$$

Relationships (9) through (13) are represented in the tables in binary form. If the tables accepted prediction error values which were not biased, in other words both positive and negative values, then there would be an odd number of three-bit codewords as well.

Relationship (9) defines the statistically optimal placement for the three-bit codewords for quantization tables receiving DPCM prediction error values. By placing the short codewords at reconstruction levels which are most likely to be accessed, the system is optimized to save storage bits for other purposes. Using short codewords decreases the number of levels available in a quantization table, but the bit savings outweigh the lost resolution because generally enough bits are saved in memory to accommodate the overhead information and maintain the four-bit per codeword average.

Because the tables are symmetrical about their midpoint, only half the table levels including the midpoint level need be actually stored in memory. The remaining levels may be mapped by circuitry. FIG. 7 shows one simple hardware implementation for mapping the remaining table reconstruction values upon dequantization, and output all eight-bit reconstructed pixel values for both halves of the tables.

Coding controller 29 (FIG. 2) and decoding controller 33 (FIG. 4) perform mutually similar but inverse operations for chroma pixel blocks. They both include four registers which count the number of pixels processed for each block, and the number of bits conserved or needed for overhead information. One register, the range register, is a flag register which identifies which predetermined range represents the pixel block currently being processed. Utilizing the registers, controllers 29 and 33 select for each pixel processed either the three, four or five-bit quantization table and ensure the pixel block, including all overhead information, is compressed to a predetermined size for storage in memory 14, and then decompressed and reconstructed to the original pixel block.

The overhead information included for chroma data requires a predetermined number of bits depending upon the block parameters to be stored. FIG. 8 shows the number of overhead bits required for each block parameter for each predetermined range. Each pixel, including the reference pixel, has an average of four bits reserved in memory 14. Controller 29 compensates for four fewer bits than the total number of bits used for overhead. The number of bits needed as compensation for overhead bits for each predetermined range is shown in the last row of FIG. 8.

The primary objective of controller 29 is to encode each pixel with either the four or five-bit tables, and to only use the three-bit table when necessary to ensure that all block pixels will fit into the reserved space. The short, three-bit codewords in the four and five-bit tables provide the best opportunity to meet this objective. Since the short codewords are statistically placed within the tables in levels most likely to be accessed for DPCM data, each block will often be compressed without using the three-bit quantization table. Furthermore, generally several pixel within any given pixel block will be quantized with five-bit codewords, thereby increasing resolution and display quality. However, if the pixel block does not access the short codewords in the four and five-bit quantization tables often enough to compensate for the required number of overhead bits, controller 29 will access the three-bit quantization table. Controller 29 identifies the last N bits in each pixel block as low priority pixels (LPP), where N is the number of compensated overhead bits for that pixel block. Based on the counters which identify when an LPP is being processed and how many overhead bits remain uncompensated, controller 29 selects the three-bit quantization table for LPP's. Controller 29 will not select the three-bit quantization table until the number of pixels remaining to be compressed equals the number of overhead bits which remain uncompensated.

Figure 9A:
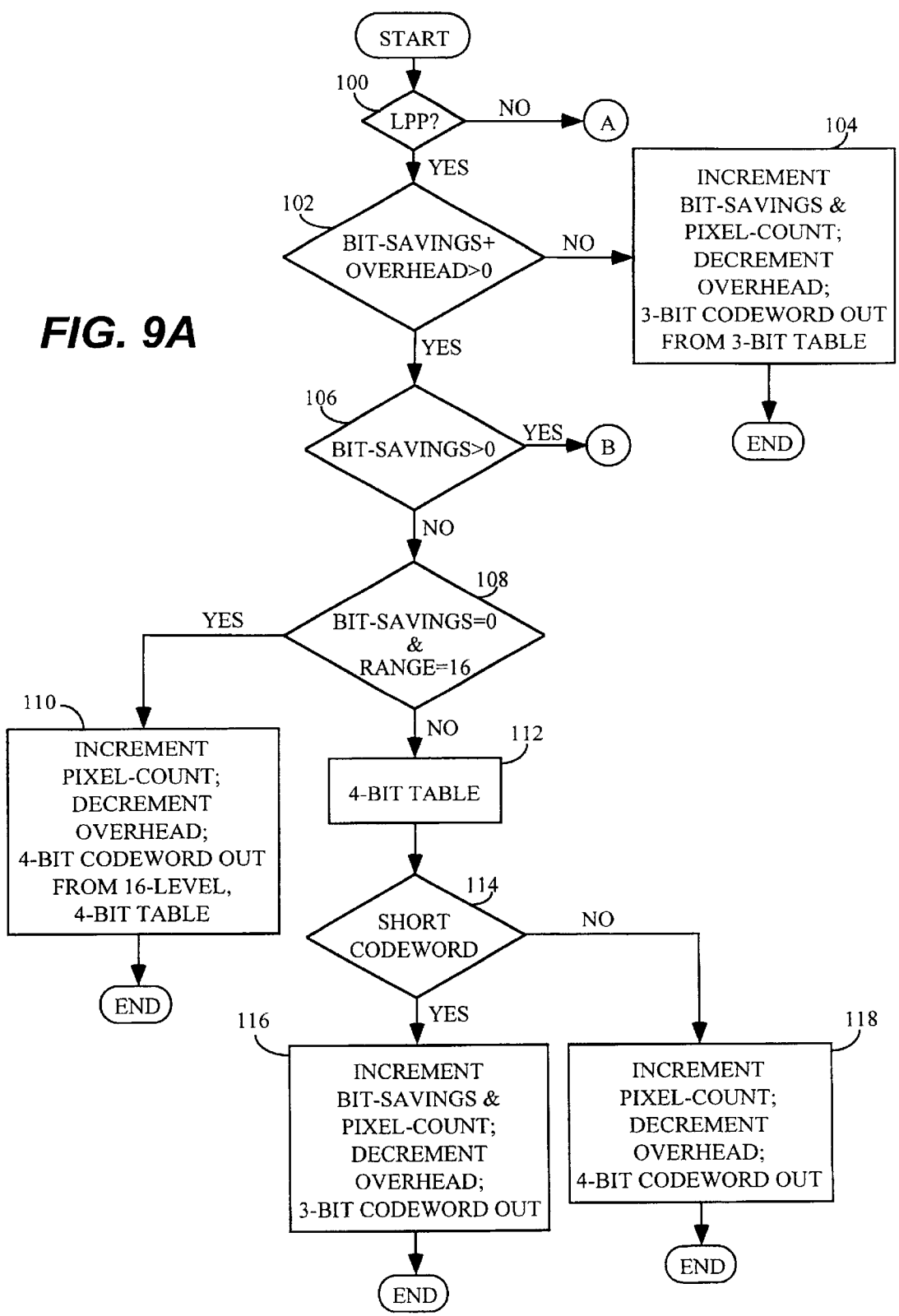
FIGS. 9A, 9B and 9C represent a flow chart of a coding controller according to the principles of the present invention.
Figure 9B:
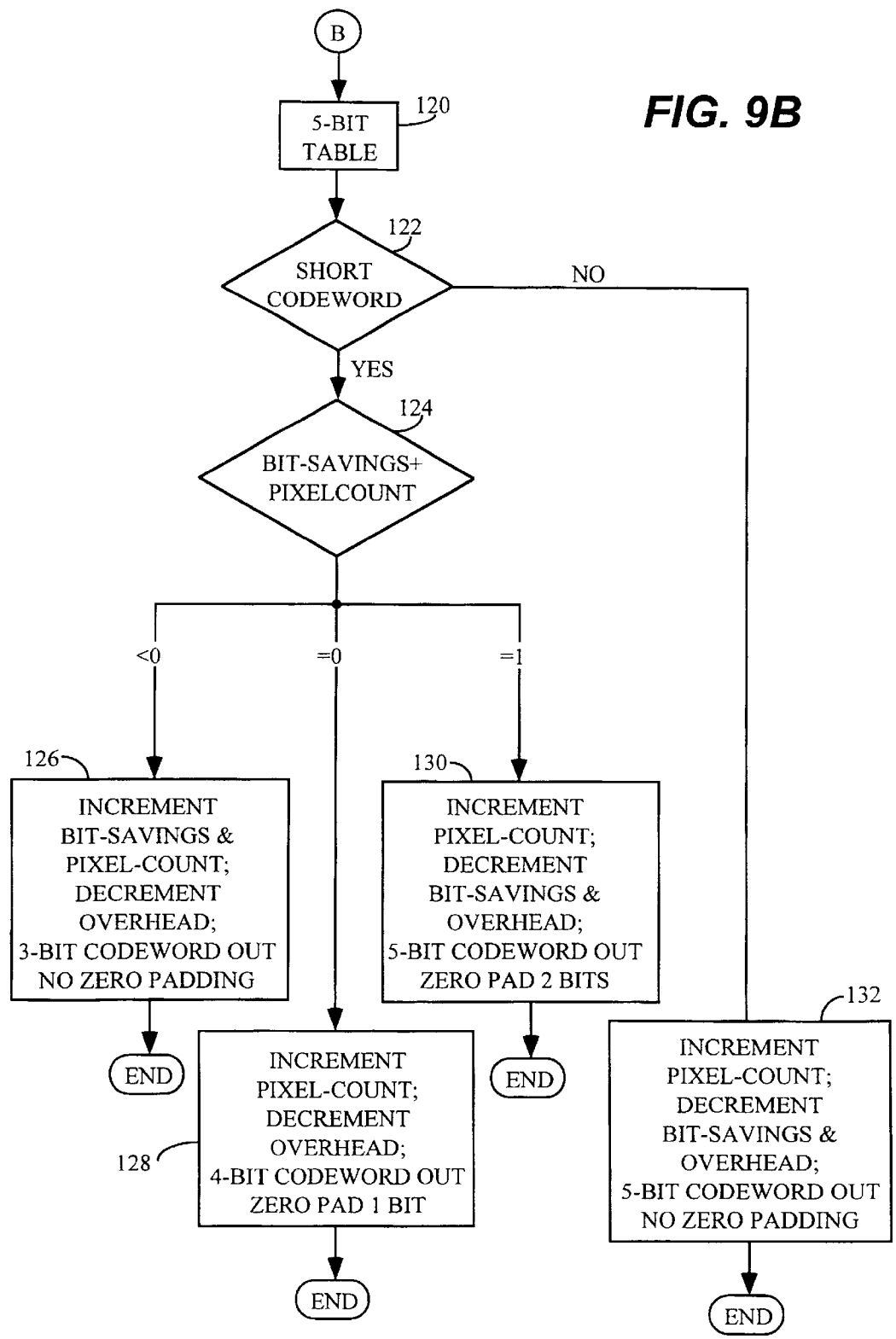
Figure 9C:
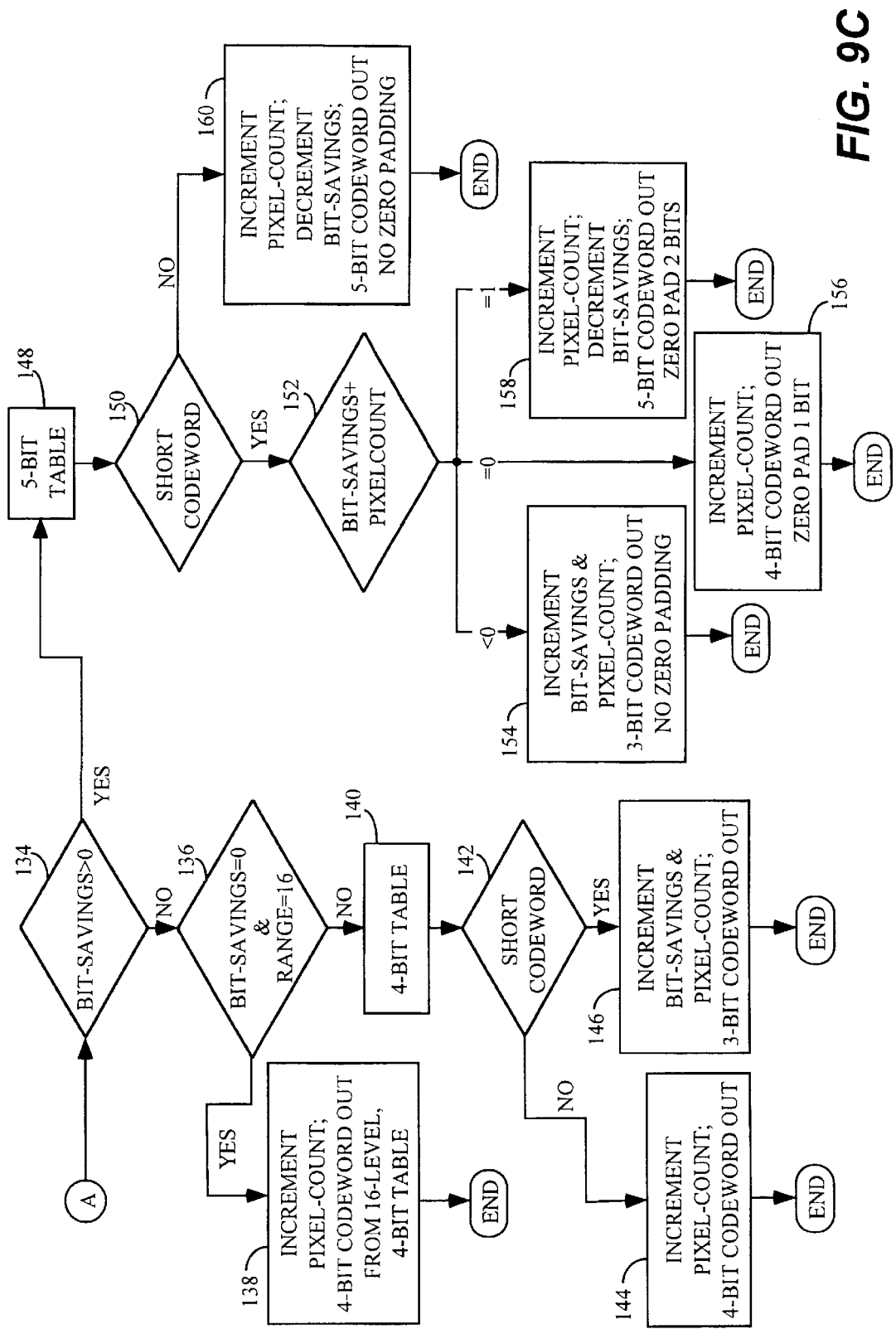

FIGS. 9A, 9B, and 9C depict a flow chart of controllers 29 and 33. Both controllers operate in the same manner, and perform the same steps to either compress or decompress a pixel value. To simplify the discussion of controllers 29 and 33, only compression controller 29 will be explained.

At Start, four registers are initialized at the beginning of each chroma pixel block. The range register is coded according to the predetermined range for the current pixel block. The overhead register is set to the number of overhead bits for which controller 29 must compensate, as shown in FIG. 8. This register is decremented by one every time an LPP is processed. The bit-savings register is initialized to the negative value of the overhead register, and is incremented each time a short codeword is used. The pixel-count register is initialized to the negative value of the number of pixels in the current pixel block. The register is incremented each time a pixel is processed. Pixel-count is used to identify whether the pixel being processed is an LPP.

At Start in FIG. 9A, an eight-bit pixel value passes to step 100 and identifies whether the pixel is a low priority pixel (LPP). If so, step 102 adds bit-savings and overhead and compares the result to zero. This is a significant step because if sufficient bits have not been saved at this point, the three-bit quantization table is accessed and a three-bit codeword is used to compress the pixel in step 104. Since the current pixel is an LPP, all preceding pixels processed may not have been compressed with the short, three-bit codewords in the four-bit table a sufficient number of times to compensate for all overhead bits in this pixel block. Therefore, if the register values of bit-savings+overhead>0, a bit must be saved here and the three-bit, low resolution table is used to compress the pixel. At the same time, the bit-savings and pixel-count registers are incremented, and the overhead register is decremented. At this point, the pixel is compressed and the next pixel is processed from Start.

If in step 102 the result is greater than zero, step 106 determines if bit-savings is greater than zero. If not, there are just enough bits saved to compensate for the overhead to that point, and there are the same number of LPP's remaining as there are uncompensated overhead bits. Then step 104 increments bit-savings and pixel-count, decrements overhead, and outputs the three-bit codeword from the three-bit table. If bit-savings is greater than zero in step 106, step 108 checks for the unique circumstance of bit-savings=0 and range=16. If this occurs, step 110 accesses the sixteen level, four-bit quantization table without short codewords because there is no need to save a bit for this pixel. Pixel-count is incremented, overhead is decremented, and the next pixel is retrieved for compression. If the result of step 108 is no, the four-bit table for the current predetermined range is accessed in step 112. Step 114 checks if the pixel value falls into a short codeword level of the four-bit table. If so, step 116 increments bit-savings and pixel-count, decrements overhead, and outputs the three-bit codeword. If not, step 118 increments pixel-count, decrements overhead, and outputs the four-bit codeword. After both steps 116 and 118, the next pixel is retrieved for processing beginning at Start.

Going back to step 106, and remembering that the pixel was determined to be an LPP in step 100, if bit-savings is greater than zero then the process continues in FIG. 9B. Since bit-savings is greater than zero, there have been more than a sufficient number of bits saved to that point in the pixel block. Therefore, the high resolution five-bit table is used in step 120. The five-bit table contains short codewords, and step 122 determines whether the pixel value falls into a short codeword level of the table. If not, step 132 increments pixel-count, decrements bit-savings and overhead, and outputs a five-bit codeword. If so, step 124 adds bit-savings and pixel-count to determine if too many bits have been saved. If the number of bits saved becomes too great, system synchronization is not maintained. To prevent this and the need for a buffer to hold the compressed data until the system catches up, three-bit codewords may be zero padded. The result of step 124 determines the path the pixel compression will follow. If the result is less than zero, then not enough bits have been saved and no zero padding occurs in step 126. Bit-savings and pixel-count are incremented, overhead is decremented, and the three-bit codeword is output. If the result is equal to zero, then the three-bit codeword will save one too many bits. Therefore in step 128 the codeword is padded with one zero, pixel-count is incremented, overhead is decremented, and the padded four-bit codeword is output. If the result of step 124 is equal to one, then the three-bit codeword will save two too many bits. Therefore in step 130 the codeword is padded with two zeros, pixel-count is incremented, bit-savings and overhead are decremented, and the padded five-bit codeword is output. After steps 126, 128, 130, and 132 the compression of the pixel is complete and the next pixel is retrieved for processing at Start.

If in step 100 the pixel is identified as not being an LPP, the process goes to step 134 where bit-savings is compared to zero. If bit-savings is not greater than zero, the steps of 108 through 118 are repeated by steps 136 through 146 with one difference. Steps 110, 116 and 118 decrement overhead because for those paths the pixel being processed is an LPP, whereas in steps 138, 144, and 146 the pixel being processed is not an LPP and overhead is not decremented.

If bit-savings is greater than zero in step 134, steps 148 through 160 repeat the steps of 120 through 132 employing the five-bit table and zero padding analysis. Again, since the pixel being processed by steps 148 through 160 is not an LPP, overhead is not decremented in steps 154, 156, 158, and 160. After all of the steps 138, 144, 146, 154, 156, 158, and 160 the compression is complete and the next pixel is retrieved for processing beginning at Start.

The objective of controller 29 is to process each chroma pixel with the highest resolution quantization table possible. Since the pixel data values are spacial representations, each pixel value contains information important to the display, unlike transformed block data which contains most of its information at the beginning of the block. This is why each pixel is processed individually considering its relative position in the pixel block and the number of bits for which controller 29 must compensate.

Referring back to FIG. 1 memory 14 stores the quantized pixel block and the parameter field until they are no longer needed for pixel reconstruction and display. During the time the data reside in memory 14, they may be accessed and decoded by a subsequent display processor via decompressor 16 under the control of a microprocessor using a common data bus. Compressor 12 and decompressor 16 reside in a common integrated circuit and exhibit similar design and construction to simplify the integrated circuit. Memory 14 advantageously resides outside the integrated circuit, thereby allowing the size of memory 14 to be selected as needed to accommodate the signal processing requirements of a particular system. This results in manufacturing cost savings, e.g., in the case of a reduced cost consumer television receiver using a reduced resolution display requiring less frame memory for the MPEG decoder. Furthermore, even though memory 14 may reside outside of the integrated circuit, state of the art unified memory architectures allow any unused storage area within memory 14 to be usable by other system components. This further reduces the total system cost and increases overall system capability. Also, saved storage area is typically usable by other system components which increases overall system capability.

Figure 10:
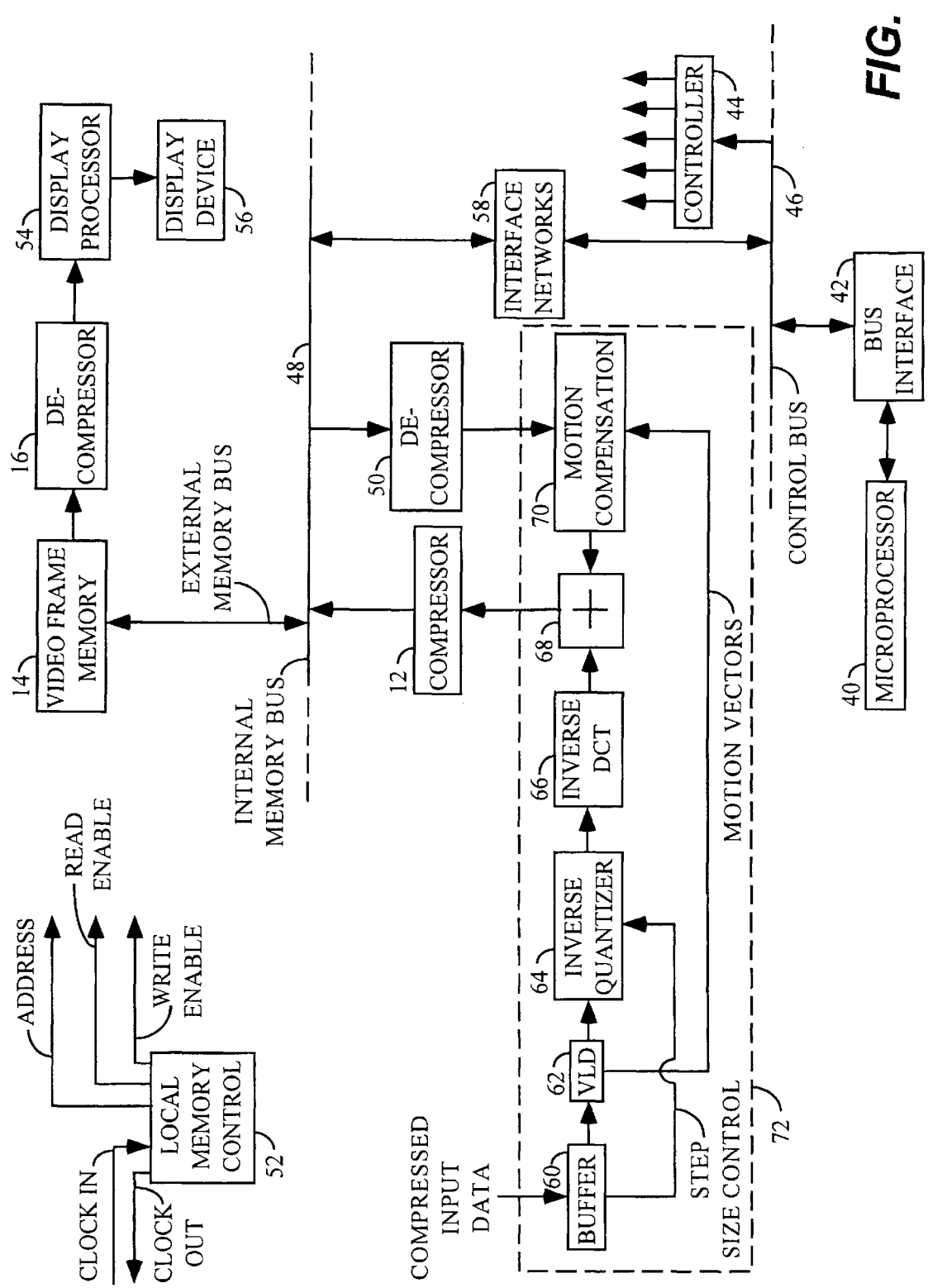
FIG. 10 is a block diagram of an MPEG compatible television system employing the present invention.

FIG. 10 exemplifies portions of a practical digital signal processing system in a television receiver, including apparatus according to the present invention as discussed previously. The digital television receiver system of FIG. 10 is simplified so as not to burden the drawing with excessive detail. For example, not shown are FIFO input and output buffers associated with various elements, read/write controls, clock generator networks, and control signals for interfacing to external memories which can be of the extended data out type (EDO) or synchronous type (SDRAM), Rambus DRAM (RDRAM) or any other kind of RAM.

Common elements in FIG. 1 and FIG. 10 have the same identifier. Elements in signal processor 72, except for unit 70, correspond to elements found in the STi 3500A MPEG-2/CCIR 600 Video Decoder integrated circuit commercially available from SGS-Thomson Microelectronics.

Briefly, the system of FIG. 10 includes microprocessor 40, bus interface unit 42 and controller 44 coupled to an internal control bus 46. In this example, microprocessor 40 is located external to the integrated circuit containing MPEG decoder 72. A 192 bit wide internal memory bus 48 is a conduit for data to and from compressor 12, similar decompressors 16 and 50, and external frame memory 14. Units 12, 16 and 50 receive compression and decompression factor control signals from microprocessor 40 via controller 44, along with enable control signals. Also included is a local memory control unit 52 which receives Request inputs and provides Acknowledge outputs as well as memory Address outputs, Read Enable and Write Enable outputs. Memory control unit 52 generates real time address and control signals for controlling memory 14. Memory control unit 52 also provides output clock signals Clock Out in response to input clock signals Clock In from a local clock generator (not shown). Microprocessor 40 partitions memory 14 into bit buffers, video frame storage sections and frame storage buffers for MPEG decoding, and display processing and on-screen display maps.

Display processor 54 includes horizontal and vertical resampling filters as needed to convert a decompressed image format to a predetermined common format for display by an image reproducing display device 56. For example, the system may receive and decode image sequences corresponding to formats such as 525 line interlaced, 1125 line interlaced or 720 line progressive scan. A television receiver will likely use a common display format for all receiver formats.

External interface networks 58 convey control and configuration information between the MPEG decoder and external microprocessor 40 in addition to input compressed video data for processing by the MPEG decoder. The MPEG decoder system resembles a coprocessor-processor for microprocessor 40. For example, microprocessor 40 issues a decode command to the MPEG decoder for each frame to be decoded. The decoder locates the associated header information, which microprocessor 40 then reads. With this information microprocessor 40 issues data for configuring the decoder, e.g. with respect to frame type, quantization matrices, etc., after which the decoder issues appropriate decode commands. Technical specification materials for the SGS-Thomson STi 3500A integrated circuit device noted above provide additional information concerning such manner of MPEG decoder operation.

Microprocessor 40 conveys mode control data, programmed by the receiver manufacturer, to memory controller 52 for controlling the operation of multiplexer 32 (FIG. 2) and demultiplexer 36 (FIG. 5), and for establishing the compression/decompression factors for units 12, 16, and 50 as required. The disclosed system can be used with all Profiles and all Levels of the MPEG specification in the context of various digital data processing schemes, such as may be associated with terrestrial broadcast, cable and satellite transmission systems, for example.

FIG. 10 also depicts a portion of a digital video signal processor 72 such as may be found in a television receiver for processing an input high definition video signal. Signal processor 72 may be included in an integrated circuit which includes provisions for receiving and processing standard definition video signals via an analog channel (not shown). Signal processor 72 includes a conventional MPEG decoder constituted by blocks 60, 62, 64, 66, 68, and 70, including frame memory 14. For example, Ang et al. "Video Compression Makes Big Gains," IEEE Spectrum, October 1991, describes the operation of an MPEG encoder and decoder.

Signal processor 72 receives a controlled data stream of MPEG coded data from a preceding input processor (not shown), e.g., a transport decoder which separates data packets after input signal demodulation. In this example, the received input data stream represents high definition image material (1920×1088 pixels) as specified in the Grand Alliance specification for the United States high definition terrestrial television broadcast system. The input data stream is in the form of a layered data stream representing a sequence of images which have been compressed using the MPEG compression standard. Periodically, the data blocks represent compressed, coded intraframe and interframe information. The intraframe information comprises I-frame anchor frames. Generally, the interframe information comprises predictive motion coded residual information representing the image difference between adjacent picture frames. The interframe motion coding involves generating motion vectors representing the offset between a current block being processed and a block in a prior reconstructed image. The motion vector which represents the best match between the current and prior blocks is coded and transmitted. Also, the difference (residual) between each motion compensated 8×8 block and the prior reconstructed block is discrete cosine transformed (DCT), quantized and variable length coded (VLC) before being transmitted. Various publications, including Ang, et al. above, describe motion compensated coding processes in greater detail.

Buffer 60 accepts the input compressed pixel data blocks before being variable length decoded by variable length decoder (VLD) 62. Buffer 60 exhibits a storage capacity of 1.75 Mbits in the case of a main level, main profile MPEG data stream. Inverse quantizer 64 and inverse discrete cosine transformer (IDCT) 66 decompress decoded compressed data from VLD 62. Output data from IDCT 66 is coupled to one input of adder 68.

A signal from buffer 60 controls the quantization step size of inverse quantizer 64 to assure smooth data flow. VLD 62 provides decoded motion vectors to motion compensation unit 70 as will be discussed. VLD 62 also produces an inter/intra frame mode select control signal as known (not shown for simplification). The operation performed by units 62, 64, and 66 are inverse corresponding operations of an encoder located at a transmitter.

By summing the residual image data from unit 66 with predicted image data provided from the output of unit 70, adder 68 provides a reconstructed pixel based on the contents of video frame memory 14. When signal processor 72 has processed an entire frame of pixel blocks, frame memory 14 stores the resulting reconstructed image. In the interframe mode, motion vectors obtained from VLD 62 provide the location of the predicted blocks from unit 70.

The image reconstruction process involving adder 68, memory 14 and motion compensation unit 70 advantageously exhibits significantly reduced memory requirements due to the use of block compressor 12 prior to data storage in frame memory 14. The size of frame memory 14 may be reduced by up to fifty percent (50%), for example, when a 50% compression factor is used. Unit 50 performs the inverse function of unit 12, and is similar to decompressor 16 described above. Decompressor 50 reconstructs the image block so motion compensator 70 may function as described above. Compressor 12 and decompressors 16 and 50 are constructed in accordance with the principles of the present invention. FIGS. 1, 2, 4, 5A and 7 illustrate details within units 12, 16 and 50.

What is claimed is:

1. In a digital image processing system for receiving a data stream of compressed image pixel blocks apparatus comprising:

means for decompressing said compressed pixel blocks;

a circuit for recompressing pixel representations from a decompressed pixel block such that the average number of bits for a compressed luminance pixel representation is at least one bit greater than for a compressed chrominance pixel representation;

a memory for storing said recompressed pixel representations;

a predictor for producing prediction error values from said pixel representations;

a second circuit for deriving a block parameter from said pixel block;

a prediction error processor for biasing negative prediction error values to produce positive values before recompression; and a controller for ensuring a recompressed pixel block and said block parameter equal a predetermined number of bits.

2. The system of claim 1, wherein said second circuit matches the range of pixel values of said pixel block to a set of predetermined ranges and selects a predetermined range; and said predetermined range accesses a set of compression tables customized to said predetermined range.

3. The system of claim 2, wherein said customized tables include short codewords.

4. The system of claim 2, wherein said customized tables are symmetrical.

5. The system of claim 1, wherein said block parameter is encoded and arranged as a parameter field of said recompressed pixel block; and said parameter field and said compressed pixel block form a data packet.

6. The system of claim 1, wherein:

said block parameter of said pixel block is one of the minimum pixel value, the maximum pixel value, said reference pixel value, said range, and said predetermined range.

7. In a digital image processing system for processing MPEG coded image pixel blocks containing luminance and chrominance data, wherein said luminance data is represented by more pixels than said chrominance data, apparatus comprising:

a decompressor (72) for decompressing compressed pixel blocks;

a circuit (20) for recompressing pixel representations from a decompressed pixel block into recompressed pixel representations; and a frame memory (14) for storing said recompressed pixel representations;

wherein said decompressed pixel block contains luminance and chrominance data which are recompressed to a predetermined average number of bits, wherein the average number of bits for a luminance pixel representation is at least one bit greater than for a chrominance pixel representation;

a prediction network for processing prediction error values;

a decompressor for decompressing said recompressed pixel representations into reconstructed pixels; and a display processor for receiving pixel information from said memory to an image display device exhibiting resolution greater than standard NTSC resolution;

wherein said recompressed pixel representations are said prediction error values, said prediction error values are differential pulse code modulation values; and said recompression is facilitated by biasing negative prediction errors to be positive prediction errors.

* * * * *